(12) United States Patent
Inamasu et al.

(10) Patent No.: US 6,345,205 B1
(45) Date of Patent: Feb. 5, 2002

(54) SUPPORT SYSTEM FOR LASER BEAM MACHINE, AND LASER BEAM MACHINE INCLUDING THE SAME

(75) Inventors: Toru Inamasu; Takayuki Aoki, both of Kanagawa (JP)

(73) Assignee: Amada Company, Limited, Kanagawa (JP)

( * ) Notice: Subject to any disclaimer, the term of this patent is extended or adjusted under 35 U.S.C. 154(b) by 0 days.

(21) Appl. No.: 09/103,379

(22) Filed: Jun. 24, 1998

(30) Foreign Application Priority Data

Jun. 24, 1997 (JP) .............................................. 9-203717

(51) Int. Cl.[7] .............................................. G06F 19/00
(52) U.S. Cl. ......................................... 700/47; 700/166
(58) Field of Search .............................. 700/47, 17, 83, 700/166; 726/45; 711/117

(56) References Cited

U.S. PATENT DOCUMENTS

| | | | |
|---|---|---|---|
| 5,010,634 A | * 4/1991 | Uemura et al. | 29/407 |
| 5,377,321 A | * 12/1994 | Kaneko et al. | 395/163 |
| 5,517,420 A | * 5/1996 | Kinsman et al. | 364/474 |
| 5,659,479 A | * 8/1997 | Duley et al. | 364/474 |

* cited by examiner

*Primary Examiner*—Bipin Shalwala
*Assistant Examiner*—Nitin Patel
(74) *Attorney, Agent, or Firm*—Greenblum & Bernstein, P.L.C.

(57) ABSTRACT

A support system for a laser beam machine is provided which includes an inferred value production unit which produces an inferred value for each of a plurality of processing condition parameters indicative of conditions under which laser processing is performed, by use of an artificial intelligence function, and a display unit which displays the inferred value produced by the inferred value production unit. The support system further includes an input unit which allows an operator to enter a plurality of evaluation parameters that represent results of evaluation on a current processing state. The inferred value production unit includes a processing condition parameter selecting portion for selecting one of the processing condition parameters which is most effective to modify the current processing state, according to the evaluation parameters entered through the input unit, and an inferred value calculating portion for calculating the inferred value based on the output of the processing condition parameter selecting portion, and the evaluation parameters entered through the input unit.

14 Claims, 10 Drawing Sheets

FIG.3

INPUT OF PURPOSE-OF-CHANGE

Enter the purpose of changing processing conditions.

Select the purpose of changing processing conditions and the processing condition No. to be changed.

Purpose of Change
- ☐ Poor Piercing
- ☐ Gouging
- ☐ Avoidance of alarm
- ☐ Adjustment of process parameters

Processing Condition No.
- ○ Condition No. 1    ○ Condition No. 6
- ○ Condition No. 2    ○ Condition No. 7
- ⦿ Condition No. 3    ○ Condition No. 8
- ○ Condition No. 4    ○ Condition No. 9
- ○ Condition No. 5    ○ Condition No. 10

Adjustment Item
- ⦿ Quality Conscious   ○ Speed Conscious
- ○ Cost Conscious

OK

| Processing Condition | |
|---|---|
| Processing Condition No. | 3 |
| Name of Material | SPC12 × |
| Type of Material | SPC |
| Thickness | 2.5 |
| Piercing No. | 102 |
| Material Information | Aluminum |
| Speed | 4500 |
| Peak Output | 1500 |
| Frequency | 400 |
| Duty Ratio | 20 |
| Gas Pressure | 10000 |
| Focal Point | 500 |

FIG. 4

INPUT OF PROCESSING STATE

Enter the current processing state. [Re-processing: One process completed]

| Purpose of Change | Adjustment of process parameters (Quality conscious) |
|---|---|

Enter the results of evaluation on the items indicated below.

| Evaluation Item | (Poor) | Evaluation Result | | (Good) | Processing State |
|---|---|---|---|---|---|
| Burning | ▓ | | | | very poor |
| Dross | | ▓ | | | poor |
| ---- | | | | ▓ | no problem |
| ---- | | | | ▓ | no problem |
| ---- | | | | ▓ | no problem |
| Processing Cost | | | | ▓ | little problem |

⇧  OK — 107

203a → Burning
203b → Dross
203c → (Poor column cell)
203d → ----
203e → (Evaluation Result cell)
203f → Processing Cost
203 → (window)

| Processing Condition | |
|---|---|
| Processing Condition No. | 3 |
| Name of Material | SPC12 × |
| Type of Material | SPC |
| Thickness | 2.5 |
| Piercing No. | 102 |
| Material Information | Aluminum |
| Speed | 4500 |
| Peak Output | 1500 |
| Frequency | 400 |
| Duty Ratio | 20 |
| Gas Pressure | 10000 |
| Focal Point | 500 |

FIG.5

| Processing Condition | |
|---|---|
| Processing Condition No. | 3 |
| Name of Material | SPC12 × |
| Type of Material | SPC |
| Thickness | 2.5 |
| Piercing No. | 102 |
| Material Information | Aluminum |
| Speed | 4500 |
| Peak Output | 1500 |
| Frequency | 400 |
| Duty Ratio | 20 |
| Gas Pressure | 10000 |
| Focal Point | 500 |

Guidance for changing processing conditions is displayed. [Re-processing: First time]

| Purpose of Change | Adjustment of process parameters (Quality conscious) | | |
|---|---|---|---|
| Processing State | Burning | Dross | Anisotropy |

Process Parameter

| Phenomenon | Speed | | Output | | Frequency | | Duty Ratio | |
|---|---|---|---|---|---|---|---|---|
| Burning | ⇩ | 5580 | ⇩ | 1500 | ⇧ | 300 | △ | 15 |
| | | 3100 | | 300 | | 300 | | 3 |
| Dross | ⇩ | 7812 | ⇩ | 900 | ⇧ | 300 | △ | 9 |
| | | 1340 | | 180 | | 300 | | 1 |
| Processing Cost | ⇩ | 6026 | ⇩ | 542 | ⇩ | 200 | ▽ | 5 |
| | | 2450 | | 216 | | 100 | | 2 |

| Current Value | 4500 | 1500 | 400 | 20 |
|---|---|---|---|---|
| Inferred Value | 4500 | 1200 | 400 | 20 |

Command Select Menu

Reference of processing history | Re-processing | Previous screen

SUPPORT SYSTEM FOR LASER BEAM MACHINE, AND LASER BEAM MACHINE INCLUDING THE SAME

TECHNICAL FIELD

The present invention relates to a support system for a laser beam machine, and a laser beam machine including the support system.

BACKGROUND ART

In a conventional control system for a laser beam machine, an operator examines a state or result of the processing after trial laser processing is performed, and, if the processing is incomplete or unsatisfactory, the operator determines a processing condition(s) or processing condition parameter(s) (such as machining speed, peak output, duty ratio, and frequency) which should be changed, and an estimates amount of change of each parameter, based on the result of the examination. Then, another trial processing is carried out based on the estimation, and this procedure is repeated until a desirable cutting result is achieved.

The operator, however, needs to be highly skilled or have enough knowledge to determine which processing condition (s), out of numerous processing conditions, should be changed, and what amount of change needs to be made to each processing condition parameter. It takes some time even for a skilled operator to appropriately change values of the processing conditions. It is therefore an object of the present invention to provide a support system for a laser beam machine, which enables an operator to easily change or adjust the processing conditions depending upon the processing state, and provide a laser beam machine including such a support system.

DISCLOSURE OF INVENTION

To accomplish the above object, the present invention provides a support system for a laser beam machine, which includes an inferred value production unit which produces an inferred value (or estimation value) for each of a plurality of processing condition parameters including a laser beam speed and a laser output, while utilizing an artificial intelligence function, and a display unit which displays the inferred value produced by the inferred value production unit.

In the support system constructed as described above, the inferred value for each of the processing conditions to be changed are produced with the artificial intelligence function, so that the final processing conditions can be easily determined by referring to the inferred or estimated values.

The above-described inferred value production unit may include a processing condition parameter selecting means for selecting one of the processing condition parameters which is most effective to modify the current processing state, based on the evaluation parameters entered through a suitable input means, and a inferred value calculating means for calculating the inferred value based on the most effective processing condition parameter selected by said processing condition parameter selecting means, and the evaluation parameters entered by a input means.

With this arrangement, the most suitable inferred values for the processing parameter(s) can be quickly obtained.

Preferably, the inferred value calculating portion includes a second table means used for calculating the inferred value based on the input parameters (such as the evaluation parameters and the most effective processing parameters).

The inferred value producing unit includes a table modifying portion which modifies the second table means in accordance with a current inferred value and a previous inferred value. With this arrangement, the accuracy of the second table means is improved, and therefore the number of operations for correcting the processing conditions can be reduced.

The support system may include a process guidance screen generating means for generating a process guidance screen which includes a processing condition parameter search guidance table that represents the relationship between each of poor processing phenomena observed as a result of laser processing, and each of a plurality of processing condition parameters indicative of conditions under which laser processing is performed. By referring to the guidance table, the process condition parameters can be easily changed or modified.

BRIEF DESCRIPTION OF DRAWINGS

The invention will be described in greater detail with reference to preferred embodiments thereof and the accompanying drawings, wherein.

DETAILED DESCRIPTION OF THE PREFERRED EMBODIMENT

A preferred embodiment of the present invention will be now described.

Figure 1:
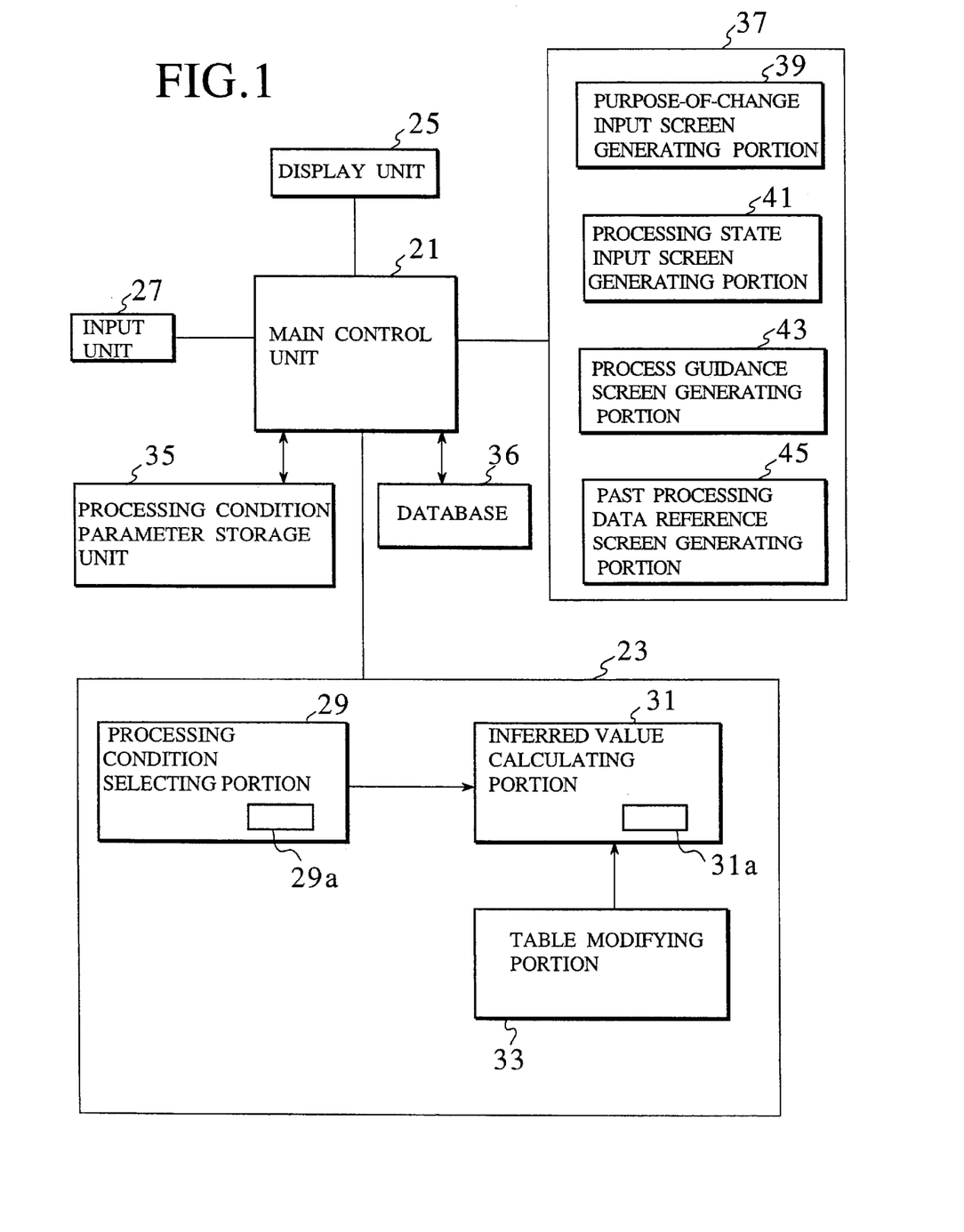
FIG. 1 is a block diagram showing the construction of an embodiment of a support system according to the present invention.

FIG. 1 is block diagram showing a support system for a laser beam machine according to the present embodiment. The support system includes a main control unit 21 which controls the operation of the whole system. To the main control unit 21, there are connected an inferred value production unit 23 for producing inferred values for laser processing condition parameters (hereinafter also referred to as "processing condition parameters" or "process parameters") by use of an artificial intelligence (AI) function, and a display unit 25 for displaying the inferred values produced by the inferred value production unit 23. To the main control unit 21 is also connected an input unit 27 which allows an operator to enter a plurality of evaluation parameters and other information that represent the operator's evaluation of the current state of laser processing.

The inferred value production unit 23 includes a processing condition selecting portion 29 for selecting, based on the evaluation parameters entered through the input unit 27, one of the processing conditions which is most effective to modify or correct the current processing state, and an inferred value calculating portion 31 for calculating the inferred values based on the evaluation parameters and the output of the processing condition selecting portion 29.

The processing condition selecting portion 29 includes a first table means 29a to which reference is made when the above-mentioned processing condition is selected, and the inferred value calculating portion 31 includes a second table means 31a to which reference is made when the inferred value is calculated based on each of the evaluation parameters and other information entered by the operator.

The inferred value production unit 23 further includes a table correcting portion 33 for correcting the second table means 31a in accordance with a difference between the inferred value obtained in the previous control cycle and the inferred value obtained in the current control cycle.

To the main control unit 21, there are further connected a processing condition parameter storage unit 35 which stores various processing condition parameters derived from the inferred values produced by the inferred value production unit 23, and a display screen generation unit 37 which generates various screen patterns to be displayed on the display unit 25.

The display screen generation unit 37 includes a purpose-of-change input screen generating portion 39 that generates a purpose-of-change input screen 201, a processing state input screen generating portion 41 that generates a processing state input screen 203, a process guidance screen generating portion 43 that generates a process guidance screen 205, and a past processing data reference screen generating portion 45 that generates past processing data reference screens 121, 123, 125, which will be described in detail below.

Referring next to FIG. 2 through FIG. 11, the operation of the support system as described above will be explained in detail.

Figure 2:
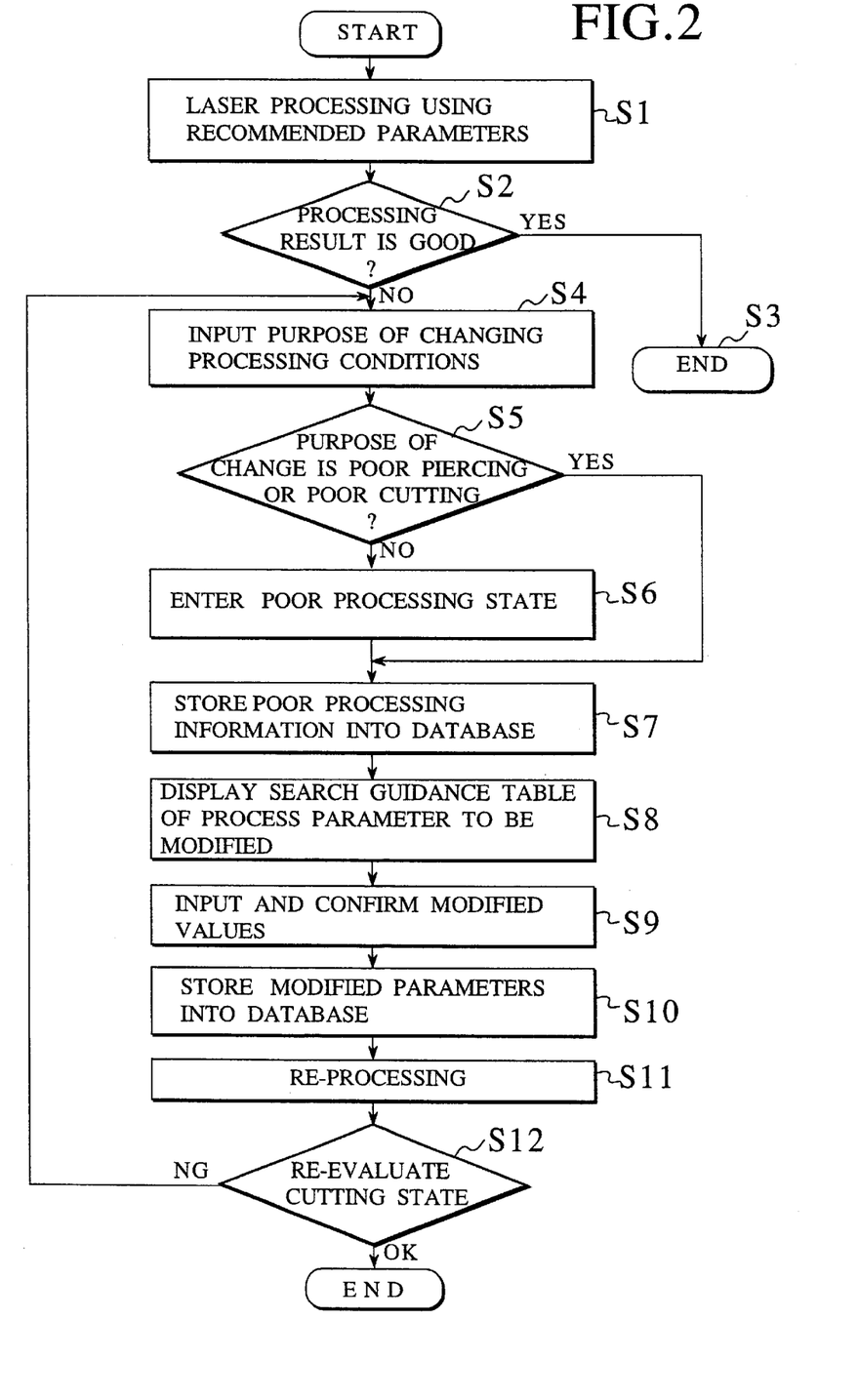
FIG. 2 is a flowchart showing the operation of the support system of FIG. 1.

FIG. 2 shows a flowchart of the operation of the support system. In step S1, laser processing or machining is carried out, using recommended processing condition parameters (for example, laser head speed, laser peak output, frequency, duty ratio, gas pressure, and focal point) which are stored in advance in the support system.

In step S2, the result of the laser processing is examined. If it is determined in step S2 that the processing result be satisfactory or favorable, the control routine ends in step S3. If the processing result is determined to be unsatisfactory, the control flow proceeds to step S4 to change the processing condition parameters.

Figure 3:
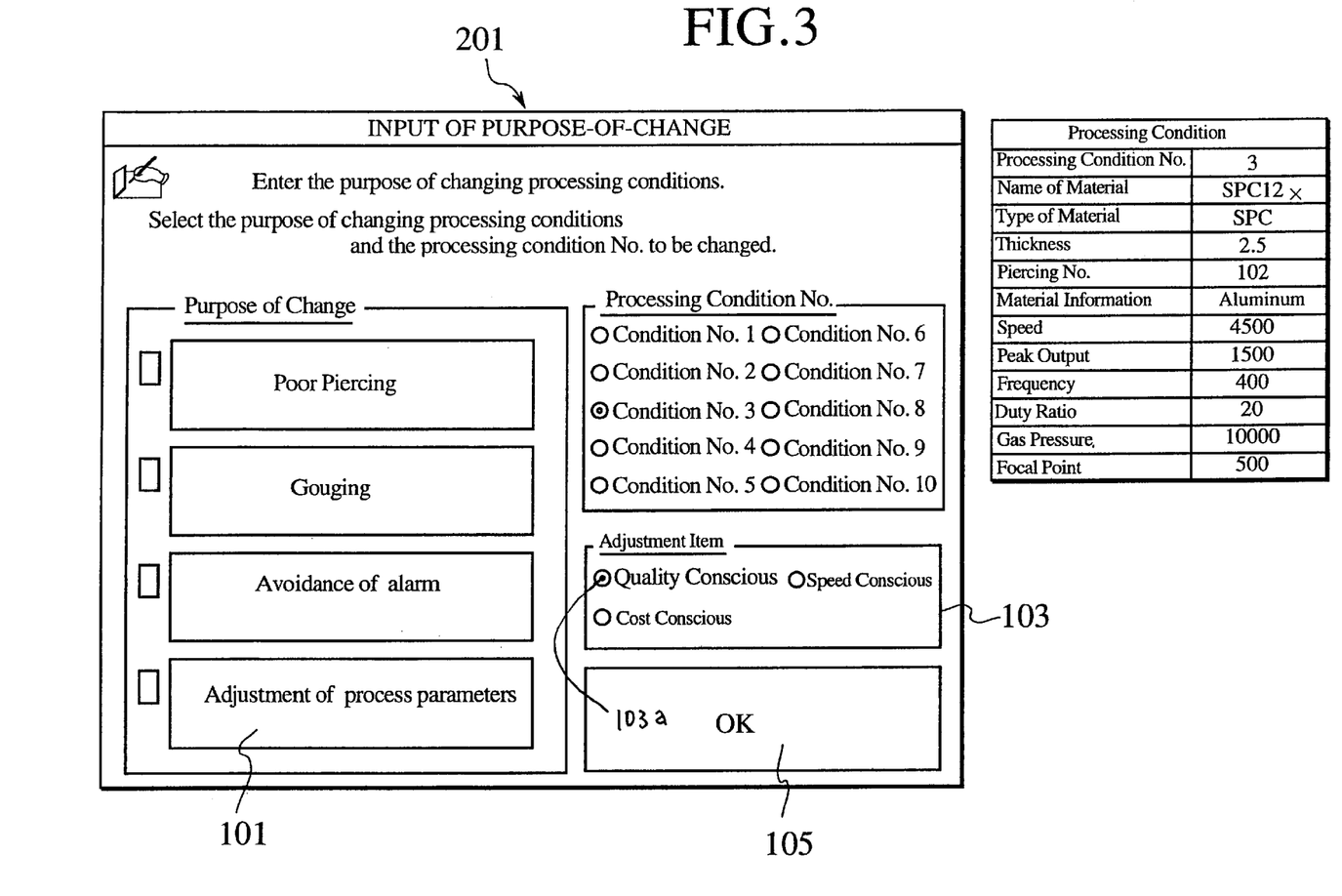
FIG. 3 is a view showing a purpose-of-change input screen displayed on a display unit of the support system of FIG. 1.

In step S4, an operator enters the purpose for which the processing condition parameters are changed. More specifically, when the operator presses a certain button on the support system, the purpose-of-change input screen producing portion 39 is activated to display the purpose-of-change input screen 201 on the display unit 25 as shown in FIG. 3. The purpose of changing the processing condition parameters may be selected from: prevention of poor piercing, prevention of gouging (or gauzing) or poor cutting, avoidance of alarms, and adjustment of the process parameters, as shown in FIG. 3,. Here, the set of process conditions to be changed are displayed in the right, upper section of the screen. The process conditions include data for specifying the name of the material of a workpiece, data for specifying the type of the material, data for specifying the thickness of the workpiece, and so forth. As shown in FIG. 3, the set of process conditions to be changed, which is numbered No. 3, are listed in the left column in the upper, right section of the screen 201, and numerical values and other information corresponding to the respective process conditions are listed in the right column.

Where the purpose of changing the processing conditions is to adjust the process parameters, a button 101 on the display of the screen 201 is selected. If the operator presses the button 101, a display 103 for principles according which processing parameters are adjusted appears on the screen 201 (the display 103 is not initially provided on the purpose-of-change input screen 201 when it is first displayed). If the process parameters are to be adjusted with a particular emphasis being placed on the quality, for example, the operator is supposed to select an principle (or item) 103a named quality conscious as shown in FIG. 3, and press an OK button 105.

Figure 4:
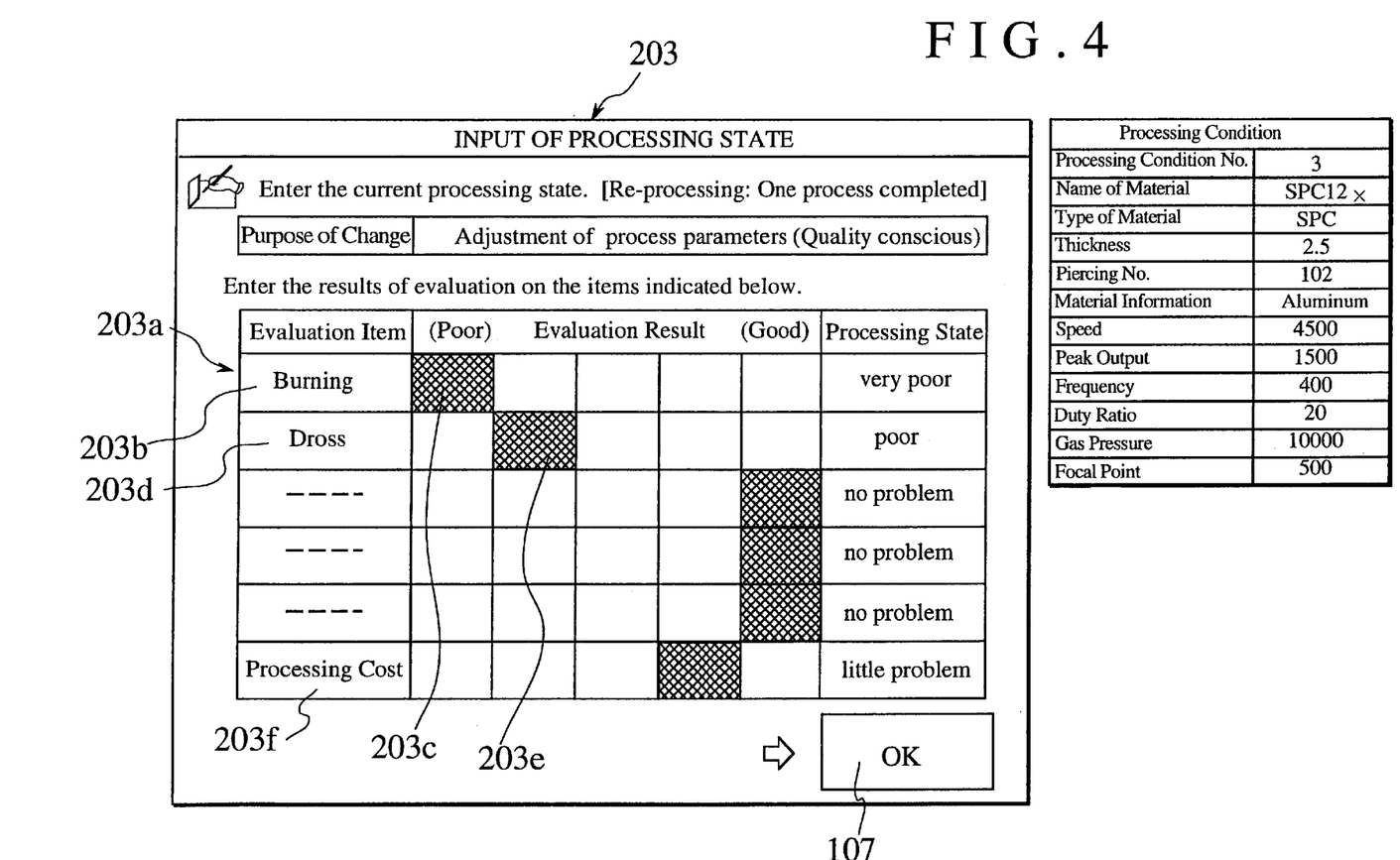
FIG. 4 is a view showing a processing state input screen displayed on the display unit of the support system of FIG. 1.

As a result, it is determined in step S5 that the purpose of change is other than prevention of poor piercing or poor cutting (gauzing), and the control flow goes to step S6. In step S6, the processing state input screen producing portion 41 is activated so that the processing state input screen 203 as shown in FIG. 4 is displayed on the display unit 25. On the processing state input screen 203, there are displayed evaluation items (or phenomena) to be evaluated 203a in terms of which the processing state is evaluated, which items include burning, dross, processing cost, and so forth. Five-step evaluation is performed on the processing state in terms of each evaluation item or phenomena listed in the leftmost column of a table on the screen 203, and the result of evaluation is indicated in a row corresponding to the evaluation item in question. In the table in which five columns are allotted to indicate five steps or grades of evaluation, respectively, the rightmost column is marked if the best or most desirable result is obtained, and the leftmost column is marked if the worst or least desirable result is obtained, while the intermediate columns indicate gradational results between the best and worst results. For instance, if the result of evaluation in terms of burning 203b turns out to be poor as a result of the trial laser processing as described above, the operator selects a box 203c located at the leftmost column in the row corresponding to the item "burning", so that the box 203c is blacked out as shown in FIG. 4. Similarly, if the result of evaluation in terms of the item "dross" 203d is relatively poor or bad, the operator selects a box located at the second column as counted from the left, in the row corresponding to the item "dross", so that the box 203e is blacked out as shown in FIG. 4. The results of evaluation thus entered by the operator, which are in the form of levels, are transmitted to and stored in a suitable storage means. These levels may be expressed in the form of values "4", "3", "2", "1", "0" that correspond to the respective columns in the order from the left to the right in the table. In the example of FIG. 4, "4" is input to the storage means as the result of evaluation on the item "burning" 203b, and "3" is input as the result of evaluation on the item "dross" 203d, while "1" is input as the result of evaluation on the item "processing cost" 203f. In the following description, these levels will also be called "evaluation parameters".

Where the laser processing is carried out again, the levels selected in the previous control cycle are displayed by default, and therefore a new set of evaluation levels may be selected in the current cycle with reference to the above levels.

When all of the above-described input operations are completed, the operator presses an OK button 107. Step S7 is then executed so that data of the evaluation parameters are stored as poor processing information in a storage unit 36, which serves as a database. At the same time, data representing "adjustment of process parameters" and "quality conscious" that were selected and entered in step S4 above may be also stored in the database 36 as a part of the poor processing information, in addition to the evaluation parameters.

When the purpose of change selected in step S4 is to prevent or overcome poor piercing or poor cutting (gouging), an affirmative decision (YES) is obtained in step S5, and the control flow goes to step S7. In step S7, information indicative of the "poor piercing" or "poor cutting" is stored in the database 36 as poor processing information.

Figure 5:
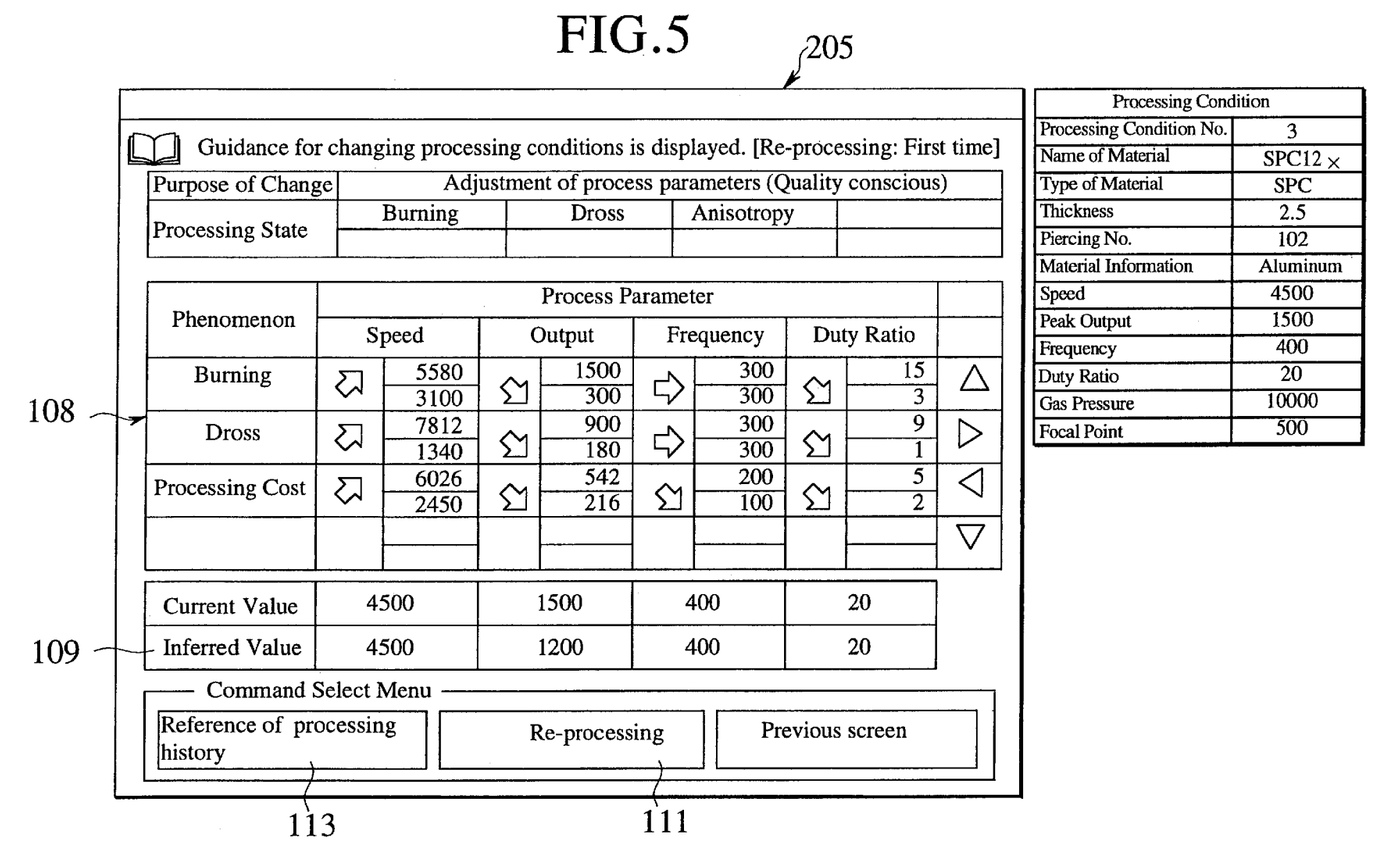
FIG. 5 is a view showing a process guidance screen displayed on the display unit of the support system of FIG. 1.

If the "poor piercing" or "poor cutting" is selected on the screen 201 of FIG. 3 and the OK button 15 is pressed, or the OK button 107 is pressed on the screen 203 of FIG. 4, the process guidance screen producing portion 43 is activated in step S8, and a process guidance screen 205 as shown in FIG. 5 is displayed on the display unit 25.

A guidance table (processing condition parameter search guidance table) 108 containing arrow-like indications is displayed on the process guidance screen 205. The guidance table 108 is created, based on a suitable intelligence base, for each item (phenomenon) that was evaluated as defective or poor with its level (evaluation parameter) being 1 or higher. In the guidance table 108, an upward arrow, which appears in a column corresponding to a certain process parameter, means that the current value of this process parameter should be increased, and a downward arrow, which appears in a column corresponding to a certain process parameter, means that the current value of this process parameter should be decreased. To prevent burning, for example, the laser head speed should be increased, and the laser output should be reduced. To provide the intelligence base as described above, data derived from TABLE 1 of a first table means 29a as described later may be used.

By referring to the guidance table 108 as described above, the operator can change or modify the processing condition parameters as desired through suitable input operations.

The process guidance screen 205 also includes an inferred value table 109, in which modified values derived by inference with an artificial intelligence function (AI function) as described later are displayed. In the example of FIG. 5, modified values that appear in the table 109 on the screen 205 are 4500 for the laser head speed, 1200 for the laser output, 400 for the frequency, and 20 for the duty ratio. Thus, the operator is able to modify the processing conditions based on the inferred, modified values.

Where the modified values in the table 109 derived by inference with the AI function are to be used, the operator presses a re-processing button 111 in step S9. Then, a confirmation screen (not shown) is displayed on the display unit 25. On this confirmation screen, the current values and modified values of the processing condition parameters are displayed in parallel with each other. If the operator confirms the modified values on the confirmation screen, step S10 is executed to store the modified values in the processing condition parameter storage unit 35 that serves as another database. The modified values thus stored in the storage unit 35 may be transferred to and stored in various types of storage media, such as a floppy disk.

Subsequently, step S11 is executed to carry out laser processing again, in accordance with the modified processing condition parameters as described above, and step S12 is then executed to re-evaluate the result of cutting.

If the operator determines in step S12 that the cutting or processing state is still unsatisfactory, the control flow returns to step S4, and the processing condition parameters are adjusted again in the next control cycle.

Figure 6:
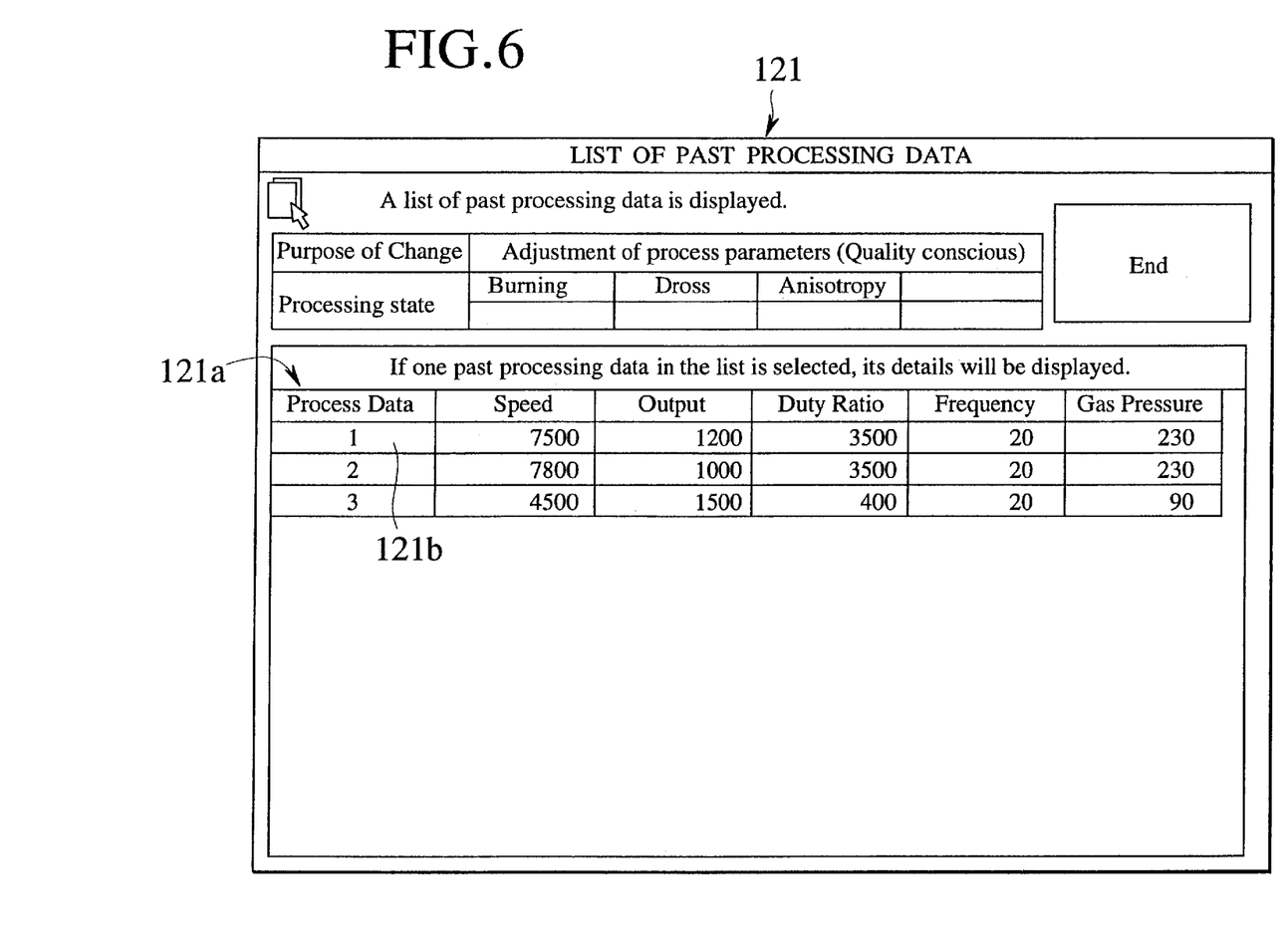
FIG. 6 is a view showing a past processing data list screen displayed on the display unit of the support system of FIG. 1.
Figure 7:
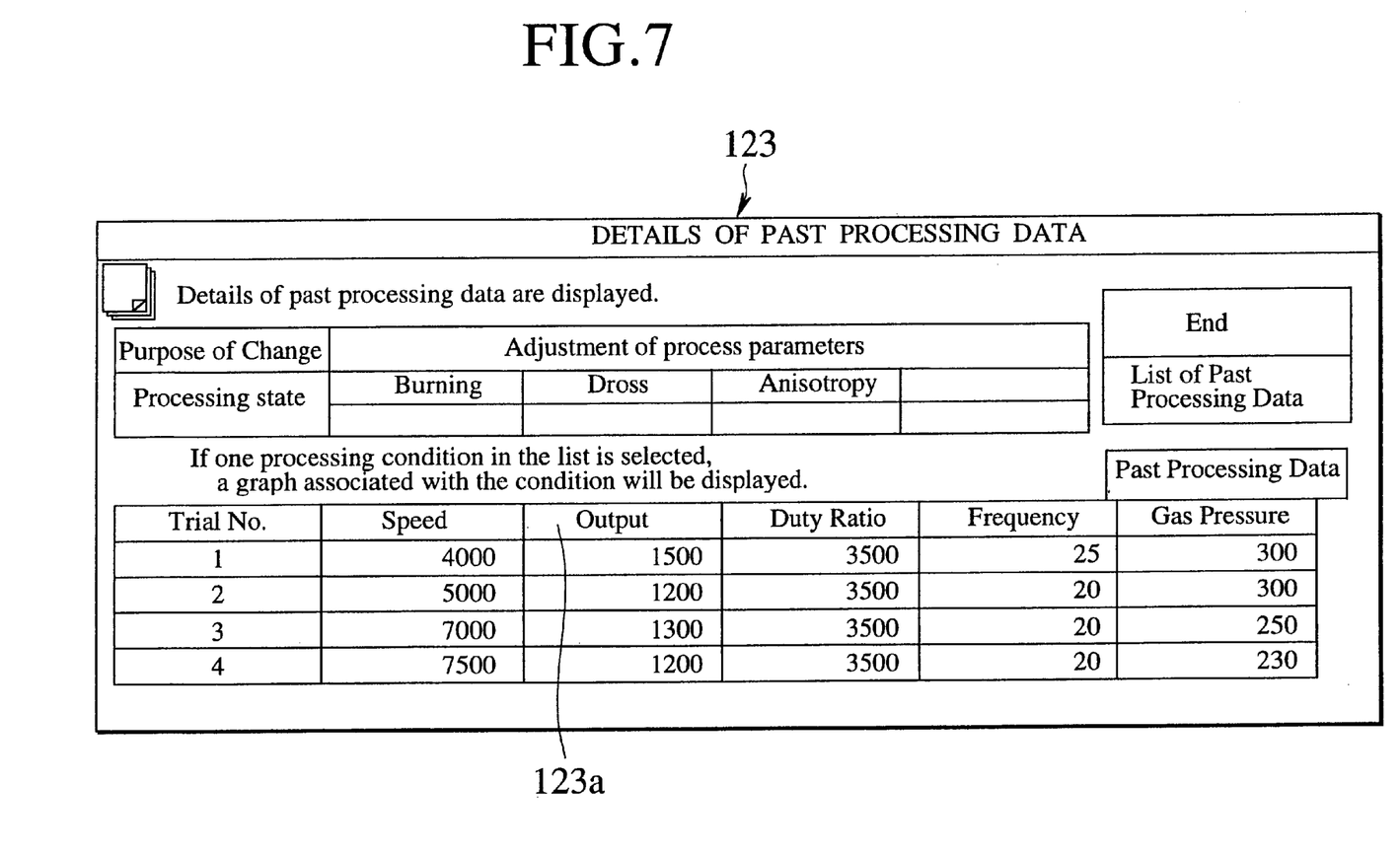
FIG. 7 is a view showing a past processing data detail screen displayed on the display unit of the support system of FIG. 1.

In step S9, the operator may change or modify the processing parameters with reference to data accumulated in the past. In this case, a past processing data reference button 113 is pressed on the screen 205 of FIG. 5. Then, a past processing data list screen 121 as shown in FIG. 6 is displayed on the display unit 25. The screen 121 includes a table in which one column 121a labeled "process data" contains numbers 1, 2, 3 identifying respective laser processings performed in the past. Then, the operator may be able to change the current values of the process parameters with reference to these data If the operator presses a box 121b as a part of the past processing data list on the screen 121 of FIG. 6, a history (process of trial and error) up to the time when the operator reached the data is displayed on a screen 123 as shown in FIG. 7. For instance, data of process data number 1 of FIG. 6 were obtained in the fourth trial processing, after carrying out three trials 1–3 in which data as shown in FIG. 7 were obtained.

Figure 8:
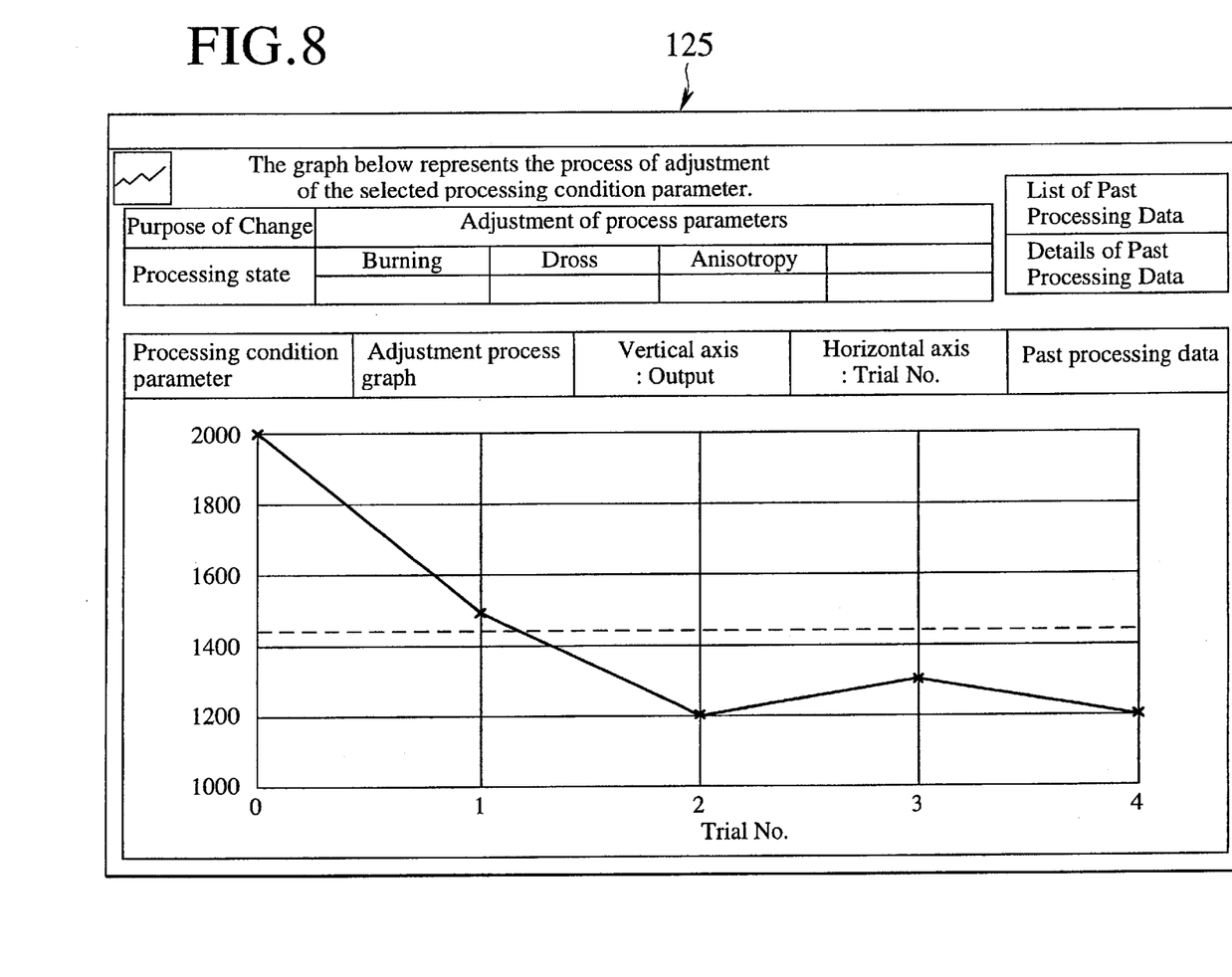
FIG. 8 is a graph showing the modification history of past trial processing, which is displayed on the display unit of the support system of FIG. 1.

If the operator presses a box 123a for one of the process parameters in the table on the screen 123 of FIG. 7, a graph representing the modification history of this process parameter is displayed as shown in FIG. 8. By referring to the graph of FIG. 8, the operator can easily change the current parameter into a desired, ideal parameter in a short time.

Figure 9:
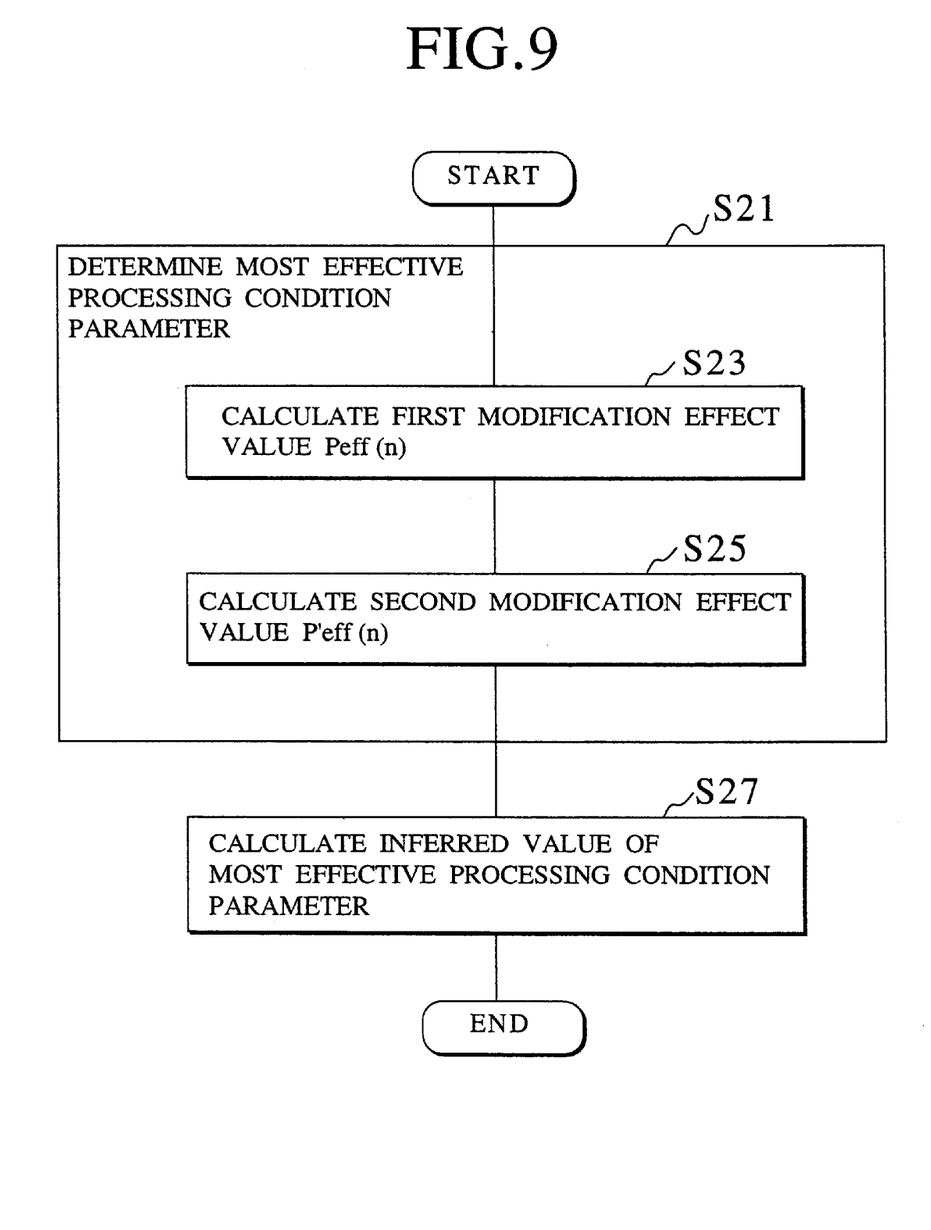
FIG. 9 is a flowchart useful in explaining the artificial intelligence function of the support system of the present invention.

Referring next to FIG. 9, the artificial intelligence function (AI function) with which the inferred values 109 (FIG. 5) for the processing condition parameters are derived by inference will be described in detail.

When the operator enters the evaluation parameters in step S6, and poor processing information is stored in the database in step S7 in the flowchart of FIG. 2, for example, the control flow goes to step S21 of FIG. 9. In step S21, it is determined based on the evaluation parameters which one of the processing condition parameters (or process parameters) may be modified to most effectively eliminate the defects in the current laser processing. This operation is executed by the processing condition selecting portion 29. To determine the most effective processing condition parameter, in step S23, a first modification effect value Peff (n) is calculated for each processing condition parameter n by using TABLE 1 as described below, which is included in the first table storing means 29a (FIG. 1).

TABLE 1

|  | Speed | Output | Duty Ratio | Frequency |
|---|---|---|---|---|
| Gouging | −1 | +1 | +1 | 0 |
| Burning | +1 | −1 | −1 | 0 |
| Dross | +1 | −1 | −1 | 0 |
| Processing Cost | +1 | +1 | +1 | 0 |

In TABLE 1, poor or undesirable phenomena observed as a result of laser processing are listed in the leftmost column, and the process parameters are listed in the uppermost row. In this table, value "+1" indicates an increase of the corresponding process parameter, and "−1" indicates a decrease of the process parameter, while "0" indicates no change in the process parameter. To prevent burning, for example, it will be understood from TABLE 1 that the laser head speed is desired to be increased, and the output is desired to be reduced.

TABLE 1 may be expressed in the form of a matrix K (m, n), wherein "m" represents the number of row corresponding to each poor phenomena, such as gouging or burning, and "n" represents the number of column corresponding to each processing condition parameter, such as the laser head speed or laser output. By using this table, the first modification effect value Peff(n) is calculated according to the equation as follows:

$$\text{Peff}(n) = \Sigma_m K(m, n) * \text{evaluation parameter } (m).$$

When the evaluation parameters of burning, dross, and processing cost obtained with respect to the current laser processing are 4, 3, and 1, respectively, and the other evaluation parameters are 0, the first modification effect values Peff (n) are calculated in the manner as follows:

$$\text{Peff}(1) \text{ "Speed"} = (-1*0) + (1*4) + (1*3) + (1*1) = 8$$

$$\text{Peff}(2) \text{ "Output"} = (1*0) + (-1*4) + (-1*3) + (1*1) = 6.$$

Depending upon the adjustment item (quality conscious, speed conscious, cost conscious) selected on the screen 201 of FIG. 3 as described above, there may be one or more processing condition parameter(s) which should not be changed, and this situation need to be reflected in the calculation of the modification effect value. In step S25, therefore, a second modification effect value P'eff(n) for each processing condition parameter is calculated by multiplying the first modification effect value Peff(n) by a filter F (i, n) which has been determined in advance for each of the adjustment items.

$$\text{P'eff}(n) = F(i, n) * \text{Peff}(n)$$

The above-described filters F (i, n) for respective adjustment items are shown in TABLE 2 below.

TABLE 2

|  | Speed | Output | Duty Ratio | Frequency |
|---|---|---|---|---|
| Quality Conscious | neg+ | 0 | 0 | 0 |
| Speed Conscious | neg− | neg+ | 0 | 0 |
| Cost Conscious | neg− | neg+ | 0 | 0 |

In TABLE 2, the adjustment items to be considered upon changes of the processing condition parameters are listed in the leftmost column, and the process condition parameters are listed in the uppermost row. With regard to the filter F (i, n), "i" represents the number of row corresponding to each of the adjustment items, such as quality conscious, speed conscious, and cost conscious, and "n" represents the number of column corresponding to each of the processing condition parameters, such as the speed, output, duty ratio and frequency. In TABLE 2, "neg+" provides value "0" when the Peff(n) for the process parameter n of the corresponding column is positive, and provides value "1" when the Peff(n) for the corresponding process parameter n is negative, while "neg−" provides value "0" when the Peff(n) for the process parameter n of the corresponding column is negative, and provides "1" when the Peff(n) for the corresponding process parameter n is positive. In the case of speed conscious (i=2), for example, the filter F (i=2, n=1) for the laser head speed n=1 is represented by "neg−", which provides value "0" when the effect value Peff(1) is negative, and provides value "1" when the effect value Peff(1) is positive.

Then, one of the processing condition parameters for which second modification effect value P'eff(n) has the largest absolute value is determined as the most effective processing condition parameter. In the above example, P'eff(1) is equal to 8, P'eff (2) is equal to 6, and P'eff(3) is equal to 0. Hence, the P'eff value of the speed (n=1) has the largest value, and therefore the speed parameter is determined as the most effective processing condition parameter. TABLE 2 above may be contained in the table storage means 29a as shown in FIG. 1.

In step S27 of FIG. 9, the inferred value calculating portion 31 calculates an inferred value of the most effective processing condition parameter, based on the result of the above calculation and the evaluation parameters entered by the operator. In this operation, the calculating portion 31 uses TABLE 3 as indicated below that is stored in the second table storage means 31a (FIG. 1).

TABLE 3

|  | Speed | Output | Duty Ratio | Frequency |
|---|---|---|---|---|
| L = 1 | 50 | 20 | 5 | 2 |
| L = 2 | 100 | 40 | 10 | 4 |
| L = 3 | 200 | 80 | 15 | 8 |
| L = 4 | 300 | 160 | 20 | 16 |

In TABLE 3, values or levels of the above-mentioned evaluation parameters are listed in the leftmost column, and the processing condition parameters, from which the most effective one is selected, are listed in the uppermost row. Each box defined by each row and each column contains a correction value for the corresponding processing condition parameter. In order to determine a modification value (correction value) by inference using TABLE 3 above, one of the processing conditions that was determined by the processing condition selecting portion 29 as the most effective condition is selected from the columns (arranged in the horizontal direction), and the largest value L, out of the evaluation parameters entered by the operator, is selected from the rows (arranged in the. vertical direction). In the above-described example, the column labeled "Speed" is selected since the speed was determined as the most effective processing condition, and the row of "L=4" is selected since the evaluation parameter "burning" has the largest level, which is equal to 4. In this manner, the speed correction value 300 included in the box corresponding to the column of "Speed" and the row of "L=4" in TABLE 3 is obtained. This value is then added to the current speed value. For example, if the current value is 1500, the final inferred speed (optimum processing condition parameter) becomes equal to 1800 as a result of the calculation.

If the evaluation parameter of gouging (or gauzing) has the largest level, and the speed is determined as the most effective processing condition, the speed need to be lowered as indicated in TABLE 1. Accordingly, the inferred value (optimum processing condition parameter) is obtained by subtracting the correction value from the current value.

Figure 10:
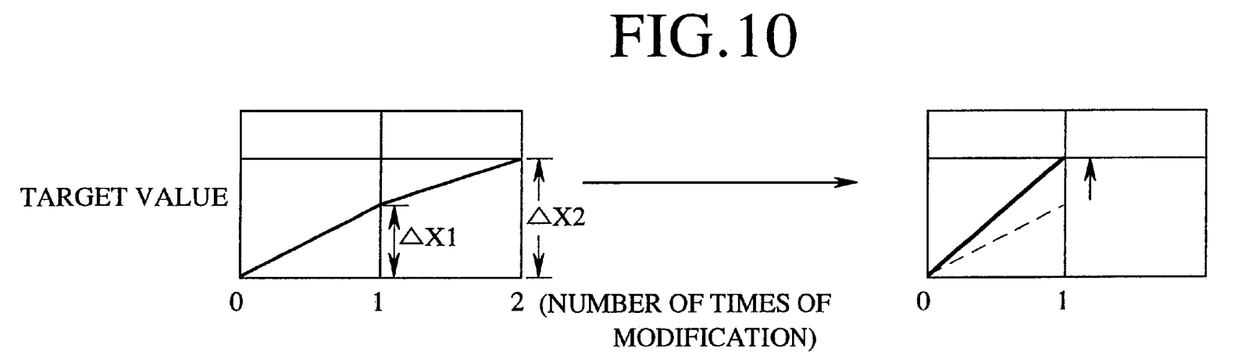
FIG. 10 is a view useful in explaining the operation of a table modifying portion of the support system of FIG. 1.
Figure 11:
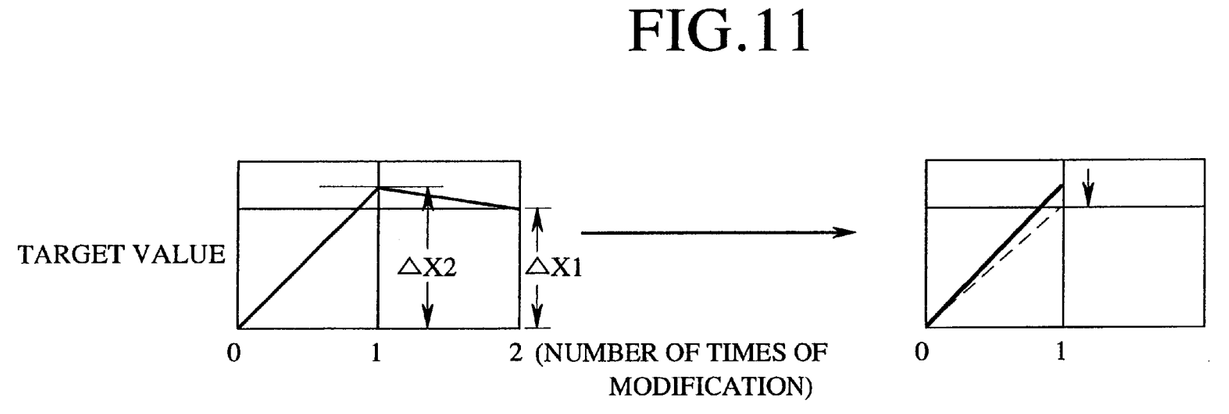
FIG. 11 is another view useful in explaining the operation of the table modifying portion of the support system of FIG. 1.

In order to reduce the number of times of processing condition modifying operations with the AI function as described above, it is necessary to provide the second table means (TABLE 3) which contains the most appropriate values with respect to the levels of poor processing (evaluation parameters) entered by the operator. To this end, the support system of the present embodiment is provided with the table modifying portion 33 for modifying the second table means (TABLE 3) each time the processing condition parameter is modified by inference. Referring to FIG. 10 and FIG. 11, the operation of the table modifying portion 33 will be explained in detail.

If the sign (+: increase, −: decrease) of the modification amount Δ X1 obtained in the previous control cycle is the same as that of the modification amount Δ X2 obtained in the current cycle, as shown in the graph on the left-hand side of FIG. 10, it means that the modification amount used for the first time was not sufficient, and thus the value in the modification value table needs to be increased. (It is to be noted that Δ X represents each correction value in TABLE 3, and in the case of the speed, for example, the correction values are 50, 100, 200, 300). Here, if the level of poor processing (evaluation parameter) is very low (that is, where the absolute value of Δ X is smaller than a predetermined value), however, the correction value may be regarded as an error within a permitted range or limit, and no modification is performed on the process parameter. If each box in TABLE 3 is represented by M (n, m), TABLE 3 is modified by changing the correction values according to the following equation:

$$M(n, m)=M(n, m)*Kp,$$

where Kp represents a learning gain, which is larger than 1. As a result of this modification, the inferred correction value becomes larger than that used in the previous operation, and the processing condition parameter can reach a target value through only one correcting operation, as shown in the graph on the right-hand side of FIG. 10.

If the sign (+: increase, −: decrease) of the modification amount Δ X1 obtained in the previous control cycle is opposite to that of the modification amount Δ X2 obtained in the current control cycle, as shown in the graph on the left-hand side of FIG. 1, it means that the modification amount used for the first time was too large, and thus the corresponding value in the modification value table needs to be decreased. If the level of poor processing (evaluation parameter) is very low (that is, where the absolute value of Δ X is smaller than a predetermined value), however, the correction value is regarded as an error within a permitted range, and modification is not performed on the process parameter. If each box in TABLE 3 is represented by M (n, m), TABLE 3 is modified by changing the correction values according to the following equation:

$$M(n, m)=M(n, m)*Kp,$$

where Kp represents a leaning gain, which is smaller than 1. As a result of this modification, the inferred correction value becomes smaller than that used in the previous operation, and the processing condition parameter can reach a target value through only one correcting operation, as shown in a graph on the right-hand side of FIG. 11.

According to the present invention as described above, the processing conditions can be easily changed or modified in accordance with the processing state. More specifically, even an unskilled operator can easily determine which one of the processing conditions should be changed, and by what degree the processing condition should be corrected.

What is claimed is:

1. A support system for a laser beam machine, comprising:

an inferred value producing unit that produces an inferred value for each of a plurality of processing condition parameters indicative of conditions under which laser processing is performed, by use of an artificial intelligence function;

a display unit that displays the inferred value produced by said inferred value producing unit; and an input unit that allows an operator to enter a plurality of evaluation parameters that represent results of evaluation on a current processing state;

wherein said inferred value producing unit comprises a processing condition parameter selecting portion that selects a processing condition parameter that has a greatest modification effect value Peff, the modification effect value Peff for each processing condition parameter being a function of a value that represents a general relationship between the processing condition and each undesirable phenomena, and an evaluation parameter regarding the undesirable phenomena.

2. A support system for laser beam machine as defined in claim 1, wherein said inferred value producing unit further includes an inferred value calculating portion for calculating the inferred value based on the most effective processing condition parameter selected by said processing condition parameter selecting portion, and the evaluation parameters entered by said input unit.

3. A support system for a laser beam machine according to claim 2, wherein said inferred value calculating portion includes second table means used when the inferred value is calculated based on the processing condition parameter and the evaluation parameters, and said inferred value producing unit includes table modifying portion for modifying the second table means in accordance with a current inferred value and a previous inferred value.

4. A support system for a laser beam machine, comprising:

an inferred value producing unit that produces an inferred value for each of a plurality of processing condition parameters indicative of conditions under which laser processing is performed, by use of an artificial intelligence function;

a display unit that displays the inferred value produced by said inferred value producing unit; and an input unit that allows an operator to enter a plurality of evaluation parameters that represent results of evaluation on a current processing state, wherein said inferred value producing unit comprises:

a processing condition parameter selecting portion that selects one of the processing condition parameters which is most effective to modify the current processing state, according to the evaluation parameters entered by said input unit; and an inferred value calculating portion that calculates the inferred value based on the most effective processing condition parameter selected by said processing condition parameter selecting portion, and the evaluation parameters entered by said input unit; and wherein said inferred value is calculated as the correction value of the most effective processing condition parameter in accordance with the value of the largest evaluation parameter among the entered plurality of the evaluation parameters, and the correction value is predetermined so that it increases as the value of the largest evaluation parameter increases.

5. A laser beam machine comprising the support system as defined in claim 1.

6. A support system for a laser beam machine according to claim 1, wherein each evaluation parameter represents evaluation of an undesirable phenomena that occurred during laser processing.

7. A support system for a laser beam machine according to claim 1, wherein the undesirable phenomena is at least one of gouging, burning, dross and processing cost.

8. A support system for a laser beam machine, comprising:

an inferred value producing unit that produces an inferred value for each of a plurality of processing condition parameters indicative of conditions under which laser processing is performed, by use of an artificial intelligence function;

a display unit that displays the inferred value produced by said inferred value producing unit; and an input unit that allows an operator to enter a plurality of evaluation parameters that represent results of evaluation on a current processing state, wherein said inferred value producing unit comprises:

a processing condition parameter selecting portion that selects one of the processing condition parameters which is most effective to modify the current processing state, according to the evaluation parameters entered by said input unit;

wherein the processing condition parameter, which is most effective to modify the current processing state, is selected based on a first modification effect value Peff(n) determined for each processing condition parameter n, the first modification effect value Peff(n) being determined according to an equation, $$\text{Peff}(n) = \Sigma_m K(m,n) * \text{evaluation parameter}(m),$$

wherein k(m,n) is a weight factor that is determined for each poor phenomena m and processing parameter n, K(m,n) having a positive value if the poor phenomena m is improved as the value of the processing parameter n increases and having a negative value if the poor phenomena m is made worse as the value of the processing parameter n increases.

9. A support system for a laser beam machine as defined in claim 8, wherein the processing condition parameter, which is most effective to modify the current processing state, is selected based on a second modification effect value P'eff (n) determined for each processing condition parameter, the second modification effect value P'eff (n) being determined according to an equation, $$P'\text{eff}(n) = F(i,n) * \text{Peff}(n),$$

wherein F (i,n) is a filter factor that provides value 0 for a processing parameter n that should not be changed for an adjustment item or adjustment principle i.

10. A support system for a laser beam machine, comprising:

an inferred value producing unit that produces an inferred value for each of a plurality of processing condition parameters indicative of conditions under which laser processing is performed, by use of an artificial intelligence function, the processing condition parameters including at least one of laser head speed, laser beam output power, laser beam frequency and laser beam duty ratio; and a display unit that displays the inferred value produced by said inferred value producing unit;

wherein said inferred value producing unit comprises a processing condition parameter selecting portion that selects a processing condition parameter that has a greatest modification effect value Peff, the modification effect value Peff for each processing condition parameter being a function of a value that represents a general relationship between the processing condition and each undesirable phenomena, and an evaluation parameter regarding the undesirable phenomena.

11. A support system for a laser beam machine, comprising:

an inferred value producing unit that produces an inferred value for each of a plurality of processing condition parameters indicative of conditions under which laser processing is performed, by use of an artificial intelligence function; and a display unit that displays the inferred value produced by said inferred value producing unit wherein said inferred value producing unit comprises:

a processing condition parameter selecting portion that selects one of the processing condition parameters that has a greatest modification effect value Peff according to the evaluation parameters entered by an input unit, the modification effect value Peff for each processing condition parameter being determined by a value that represents a general relationship between the processing condition and each undesirable phenomena, and that is multiplied by evaluation parameter regarding the undesirable phenomena.

12. A support system for a laser beam machine according to claim 11, further comprising:

an input unit that allows an operator to enter a plurality of evaluation parameters that represent results of evaluation on a current processing state.

13. A support system for a laser beam machine according to claim 11, wherein each evaluation parameter represents evaluation of an undesirable phenomena that occurred during laser processing.

14. A support system for a laser beam machine according to claim 13, wherein the undesirable phenomena is at least one of gouging, burning, dross and processing cost.

* * * * *

UNITED STATES PATENT AND TRADEMARK OFFICE
CERTIFICATE OF CORRECTION

PATENT NO.   : 6,345,205 B1
DATED        : February 5, 2002
INVENTOR(S)  : T. Inamasu et al.

It is certified that error appears in the above-identified patent and that said Letters Patent is hereby corrected as shown below:

Column 12,
Line 46, before "evaluation", insert -- an --.

Signed and Sealed this

Thirty-first Day of December, 2002

JAMES E. ROGAN
*Director of the United States Patent and Trademark Office*